(12) United States Patent
Saitoh

(10) Patent No.: US 6,988,381 B2
(45) Date of Patent: Jan. 24, 2006

(54) METHOD OF ELONGATING GLASS PREFORM

(75) Inventor: Tatsuhiko Saitoh, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 143 days.

(21) Appl. No.: 10/776,239

(22) Filed: Feb. 12, 2004

(65) Prior Publication Data
US 2005/0138970 A1    Jun. 30, 2005

(30) Foreign Application Priority Data
Feb. 13, 2003   (JP)   ............................. 2003-035233

(51) Int. Cl.
  C03B 37/022   (2006.01)
  C03B 37/07    (2006.01)
(52) U.S. Cl. .............................. 65/393; 65/384; 65/435
(58) Field of Classification Search ................. 65/435, 65/477, 533–537, 377, 384, 484, 382, 491, 65/488
See application file for complete search history.

(56) References Cited

U.S. PATENT DOCUMENTS 4,127,398 A * 11/1978 Singer, Jr. ..................... 65/393
5,755,849 A *  5/1998 Hoshino et al. .............. 65/381
6,178,778 B1 *  1/2001 Kenmochi et al. ............ 65/381
2004/0050110 A1 *  3/2004 Berkey et al. ................. 65/393

FOREIGN PATENT DOCUMENTS

JP         5-97459           4/1993
JP        61-295252 A        4/1994

* cited by examiner

Primary Examiner—Steven P. Griffin
Assistant Examiner—Lisa L. Herring
(74) Attorney, Agent, or Firm—McDermott Will & Emery LLP

(57) ABSTRACT

The present invention provides a method of elongating a glass preform having holes extending in the longitudinal direction while suppressing excess shrinkage of the holes. In the method of elongating a glass preform of the present invention, both ends of the glass preform having the holes extending in the longitudinal direction are held by a first holding member and a second holding member, respectively; and the glass preform is successively heat-melted from one of the ends by a heating means while the distance between the first holding member and the second holding member is increased in the longitudinal direction, to elongate the glass preform. The glass preform is elongated by heat-melting with the heating means in a manner such that the temperature T of the softened portion satisfies a relation represented by $11[° C./mm]·D+860[° C.]<T<17[° C./mm]·D+880[° C.]$, where D is the outer diameter of a post-elongation glass preform, and T is the maximum temperature of a softened portion of the glass preform heat-melted by the heating means.

5 Claims, 4 Drawing Sheets

METHOD OF ELONGATING GLASS PREFORM

BACKGROUND OF THE INVENTION

1. Field of the Invention

The present invention relates to a method of elongating a glass preform so that an optical fiber having air holes extending in the axial direction of the fiber can be produced by further drawing.

2. Description of the Related Art

Examples of an optical fiber having air holes extending in the axial direction (longitudinal direction) of the fiber are so-called holey fibers and photonic crystal fibers. Such an optical fiber having air holes extending in the axial direction of the fiber is hereinafter referred to as a "microstructured optical fiber". It is possible to make the characteristics of the microstructured optical fiber superior to those of an optical fiber having no air hole, since a difference between the mean refractive index of a core region and that of a cladding region can be controlled by controlling the size and arrangement of the air holes in a cross-section perpendicular to the fiber axis. For example, the microstructured optical fiber can exhibit wavelength dispersion of a larger absolute value than that of an optical fiber having no air hole, and such a microstructured optical fiber is expected to be applied to dispersion compensation.

A known apparatus for elongating the glass preform has a function to control the quantity of heat applied to a heating means so as to attain a uniform outer diameter of an elongated glass preform (for example, refer to Japanese Examined Patent Application Publication No. 6-24996 and Japanese Unexamined Patent Application Publication No. 5-97459). The use of such an elongation apparatus causes in some cases excess shrinkage of the air holes in the glass preform from which a microstructured optical fiber is to be produced. The excess shrinkage of the air holes makes it impossible to realize a characteristic to be achieved by the microstructured optical fiber, for example, wavelength dispersion of a large absolute value.

SUMMARY OF THE INVENTION

It is an object of the present invention to provide a method of elongating a glass preform having holes extending in the longitudinal direction in a manner in which the excess shrinkage of the holes can be suppressed.

In order to achieve the object, a method of elongating a glass preform of the present invention comprises holding both ends of the glass preform having the holes extending in the longitudinal direction by a first holding member and a second holding member, respectively, and successively heat-melting the glass preform from one of the ends by a heating means while increasing the distance between the first holding member and the second holding member in the longitudinal direction to elongate the glass preform. In the elongation method, a glass preform is elongated by heat-melting with the heating means such that the outer diameter D of the glass preform (post-elongation) and the maximum temperature T of a softened portion of the glass preform (pre-elongation) heated and melted by the heating means satisfy the relation represented by Eq. 1.

$$11[°C./mm]·D[mm]+860[°C.]<T[°C.]<17[°C./mm]·D[mm]+880[°C.] \quad (1)$$

Advantages of the present invention will become readily apparent from the following detailed description, which illustrates the best mode contemplated for carrying out the invention. The invention is capable of other and different embodiments, the details of which are capable of modifications in various obvious respects, all without departing from the invention. Accordingly, the drawings and descriptions are illustrative in nature, not restrictive.

BRIEF DESCRIPTION OF THE DRAWINGS

The present invention is illustrated by way of example, and not by way of limitation, in the figures of the accompanying drawings in which like reference numerals refer to similar elements.

DESCRIPTION OF THE PREFERRED EMBODIMENTS

A glass preform having holes which are to be formed into air holes is elongated by heat-melting to produce a microstructured optical fiber. When the glass preform is heat-melted, surface tension acts on the surfaces of the holes thereof The radial component of the surface tension increases in proportion to the curvature of the holes such that the holes are thereby subjected to excess shrinkage. Therefore, the smaller the diameter of the holes is, the more easily the excess shrinkage of the holes occurs due to the surface tension.

In a conventional elongation apparatus, the quantity of heat of a heating means is controlled so that the outer diameter of the glass preform after elongation is made uniform. However, the temperature of the heat-softened portion of the glass preform is not taken into consideration. Also, excess shrinkage occurs due to the surface tension acting on the interfaces of the holes. A possible method of decreasing excess shrinkage is to increase the viscosity of the glass preform so that the occurrence of deformation can be prevented. However, elongation is performed for elongating the glass preform, and thus the glass preform must be softened to an extent which allows elongation. The softened glass preform is also influenced by surface tension. Thus, the present invention was accomplished as a result of intensive research on temperature conditions for elongating the glass preforms in a manner such that excess shrinkage of the holes is suppressed.

Figure 1:
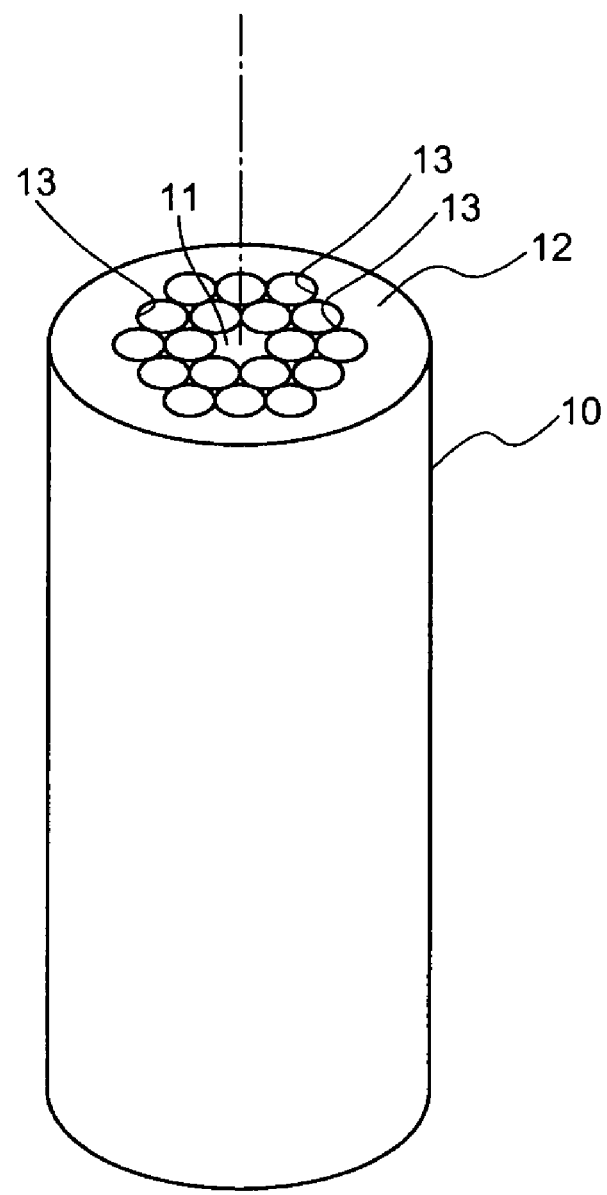
FIG. 1 is a schematic view of a microstructured optical fiber.

FIG. 1 is a schematic view of a microstructured optical fiber. The microstructured optical fiber 10 shown in FIG. 1 comprises a core region 11 extending along the fiber axis, and a cladding region 12 surrounding the circumference of the core region 11.

The core region 11 is made of silica glass containing germanium oxide ($GeO_2$), and the cladding region 12 is made of pure silica glass. The cladding region 12 has a plurality of air holes 13 formed around the core region 11 and extending in the axial direction of the fiber. The air holes 13 are arranged in a hexagonal lattice around the core region 11 in a cross-section perpendicular to the fiber axis.

In the microstructured optical fiber 10 having the above configuration, the cladding region 12 has the air holes 13, and thus the mean refractive index of the cladding region 12 is smaller than that of an optical fiber having no air hole. Therefore, the difference between the mean refractive index of the core region 11 and the cladding region 12 is greater than that of an optical fiber having no air hole formed in the cladding region 12.

Figure 2:
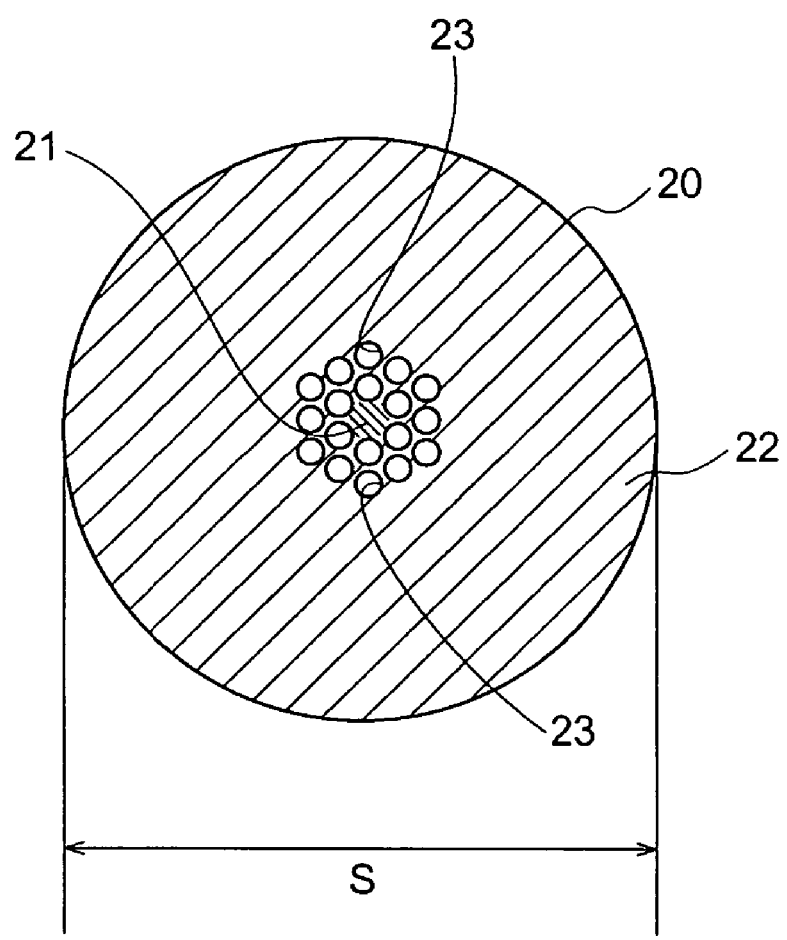
FIG. 2 is a cross-sectional view, which is taken along a plane perpendicular to the fiber axis, of a glass preform for forming a microstructured optical fiber.

FIG. 2 is a cross-sectional view taken along a direction perpendicular to the fiber axis of a glass preform 20 from which the microstructured optical fiber is formed. The glass preform 20 comprises a first region 21 which is to be formed into the core region 11, and a second region 22 which is to be formed into the cladding region 12. The second region 22 has through holes 23 which are to be formed into the air holes 13. The through holes 23 are arranged in a hexagonal lattice around the first region 21.

Figure 3:
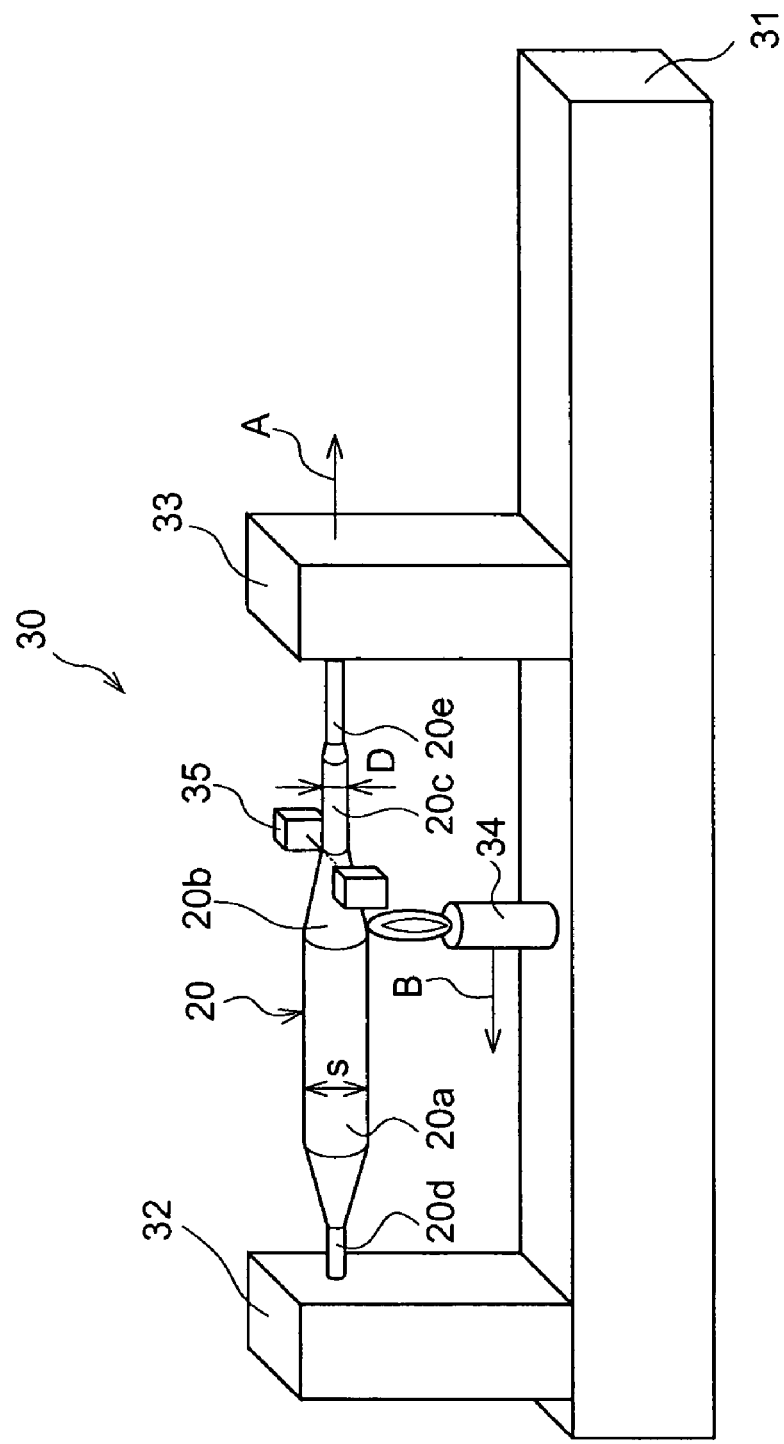
FIG. 3 is a schematic view showing a state in the course of elongation of the glass preform shown in FIG. 2.

In a process for producing the microstructured optical fiber 10, the glass preform 20 is elongated. FIG. 3 is a schematic view showing a state in the course of elongation of the glass preform 20. An elongation apparatus 30 comprises a base 31, a first holding member 32, a second holding member 33, an oxyhydrogen flame burner (heating means) 34 and a diameter monitor 35. The right end of a glass preform (pre-elongation portion) 20a having an outer diameter S before elongation is heat-melted to form a softened portion 20b. An elongated portion 20c of a post-elongation glass preform having an outer diameter D (D<S) is formed on the right side of the softened portion 20b.

Also, glass rods 20d and 20e are respectively connected as holding dummy rods to both ends of the glass preform 20. The glass rods 20d and 20e are held by the first holding member 32 and the second holding member 33, respectively, so that the glass preform 20 is held during elongation. When elongation is started, the softened portion 20b is formed, and the elongated portion 20c is formed on the right side of the softened portion 20b, i.e., adjacent to the glass rod 20e.

Each of the components of the elongation apparatus 30 will be described with reference to FIG. 3. The first holding member 32 is fixed on the top of the base 31 so as to hold the glass rod 20d connected to an end of the glass preform 20. The second holding member 33 holds the glass rod 20e connected to the other end of the glass preform 20. Each of the glass rods 20d and 20e is held by a chuck or a like means, for example. The second holding means 33 is mounted on the top of the base 31 so that it can be moved in the longitudinal direction of the base 31.

Also, the oxyhydrogen flame burner 34 is mounted on the top of the base 31 such that it can be moved in the longitudinal direction of the base 31 between the first holding member 32 and the second holding member 33. The oxyhydrogen flame burner 34 is provided for heat-melting the glass preform 20.

Furthermore, the diameter monitor 35, which is a non-contact laser type, is disposed between the first holding member 32 and the second holding member 33. The monitor 35 is for measuring the outer diameter of the softened portion 20b, particularly the outer diameter at and near the boundary between the softened portion 20b and the elongated portion 20c. The moving velocity of the second holding member 33 is controlled based on the measurement of the diameter monitor 35 so that the outer diameter D of the elongated portion 20c becomes uniform. The diameter monitor 35 is moved synchronously with the oxyhydrogen flame burner 34 to constantly measure the outer diameter of a specified position of the softened portion 20b.

Next, the method of elongating the glass preform 20 using the elongation apparatus 30 will be described. First, the glass rods 20d and 20e are held by the first holding member 32 and the second holding member 33, respectively, to hold the glass preform 20 before elongation. At the start of elongation, the oxyhydrogen flame burner 34 is disposed near the second holding member 34. The oxyhydrogen flame burner 34 is ignited. Then, the second holding member side of the pre-elongation portion 20a is heat-melted by the oxyhydrogen flame burner 34, while the second holding member 33 is moved in the direction of an arrow A to form the softened portion 20b and the elongated portion 20c having the outer diameter D. When the second holding member 33 is moved, the moving velocity of the second holding member 33 is controlled based on the measurement of the diameter monitor 35 so that the outer diameter D of the elongated portion 20c becomes uniform.

In this embodiment, the pre-elongation portion 20a is heated by the oxyhydrogen flame burner 34 so that the maximum temperature T of the softened portion 20b satisfies a relation represented by Eq. 1.

$$11[° C./mm] \cdot D[mm]+860[° C.]<T[° C.]<17[° C./mm] \cdot D[mm]+880[° C.] \quad (1)$$

Also, the glass preform 20 is preferably elongated so that the outer diameter S of the glass preform before elongation and the outer diameter (the outer diameter of the glass preform after elongation) D of the elongated portion 20c satisfies a relation represented by Eq. 2.

$$0.6 \cdot S[mm]<D[mm]<0.98 \cdot S[mm] \quad (2)$$

This is because when the elongation ratio D/S is set in the range greater than 0.6 and smaller than 0.98, the number of times of elongation can be decreased, and elongation can be stably performed. In order to further stabilize elongation, the elongation ratio D/S is preferably 0.64 or more.

As described above, when the oxyhydrogen flame burner 34 is ignited, the oxyhydrogen flame burner 34 is moved from the second holding member 33 to the first holding member 32 in the direction of an arrow B. As a result, the second holding member side of the glass preform 20 is successively heat-melted to form the elongated portion 20c.

The moving speed of the oxyhydrogen flame burner 34 is different depending upon the outer diameter S of the glass preform 20: normally, the speed of the oxyhydrogen flame burner 34 may be decreased with an increase in the outer diameter S of the glass preform 20. The moving speed of the oxyhydrogen flame burner 34 is preferably more than 4 mm/min and less than 20 mm/min. Since the oxyhydrogen burner 34 is moved at a speed of more than 4 mm/min, the occurrence of excess shrinkage of the through holes 23 is decreased. Since the oxyhydrogen burner 34 is moved at a speed of less than 20 mm/min, the glass preform 20 can be sufficiently heat-melted.

During elongation of the glass preform 20, preferably the insides of the through holes 23 are maintained under a slightly positive pressure of 200 Pa or less by flowing of a gas, preferably nitrogen, therethrough. By passing the gas in such a manner through the through holes 23, the excess shrinkage of the through holes can be suppressed.

Figure 4:
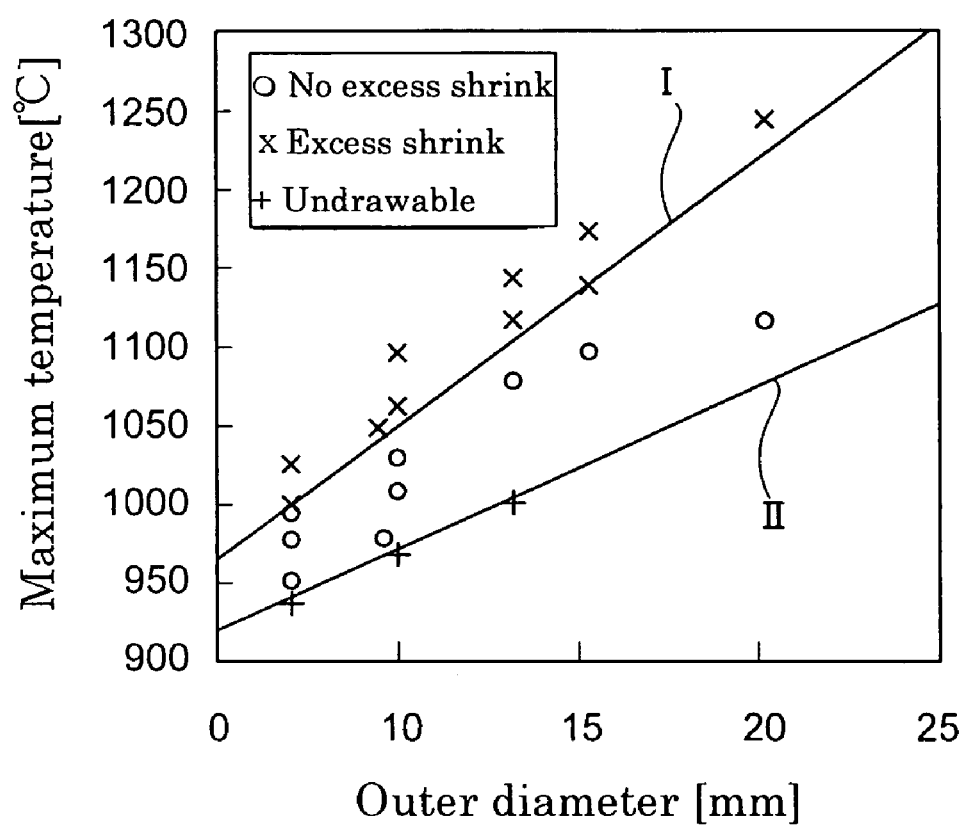
FIG. 4 is a graph showing the results of experiments with respect to the excess shrinkage of through holes in a post-elongation glass preform.

FIG. 4 is a graph showing the measurement results of excess shrinkage of the through holes 23 in the cases in which the elongation of the glass preforms 20 was performed at various maximum temperatures T of the softened portion 20b. The abscissa shows the outer diameter D of the glass preform 20, and the ordinate shows maximum temperature T of the softened portion 20b. The glass preforms 20 were elongated in a manner such that the outer diameters D of post-elongation preforms were in the range of 5 mm to 20 mm.

In FIG. 4, a case in which there was no excess shrinkage is marked with "O", a case in which there was excess shrinkage is marked with "X", and a case in which a glass preform could not be elongated is marked with +. The degree of shrinkage K [%] is defined by the following Eq. 3, wherein R1 is the diameter of the through holes 23, and R2 is the diameter of the holes, which correspond to the through holes 23, of the elongated portion 20c.

$$K[\%] = 100 \cdot \frac{R1 \,[\text{mm}] \cdot D \,[\text{mm}] - R2 \,[\text{mm}] \cdot S \,[\text{mm}]}{R1 \,[\text{mm}] \cdot D \,[\text{mm}]} \quad (3)$$

In the figure, a case in which the degree of shrinkage K is 3% or less is shown as the case of no excess shrinkage.

In FIG. 4, solid lines I and II are defined by Eq. 4 and Eq. 5, respectively.

$$T[°\text{C.}] = 17[°\text{C./mm}] \cdot D[\text{mm}] + 880[°\text{C.}] \quad (4)$$

$$T[°\text{C.}] = 11[°\text{C./mm}] \cdot D[\text{mm}] + 860[°\text{C.}] \quad (5)$$

When the temperature of the glass preform is excessively high during elongation of the glass preform, excess shrinkage of the holes occurs due to surface tension, while when the temperature is excessively low, elongation is impossible. FIG. 4 indicates that when the maximum temperature T of the softened portion 20b lies between the lines represented by Eq. 4 and Eq. 5, respectively, i.e., when the maximum temperature T satisfies Eq. 1, the glass preform 20 can be elongated without excess shrinkage of the holes.

In this embodiment, the glass preform 20 is heat-melted by moving the oxyhydrogen flame burner 34 from the second holding member 33 to the first holding member 32 at a speed between 4 mm/min and 20 mm/min so that the maximum temperature T of the softened portion 20b satisfies the relation represented by Eq. 1, and at the same time, longitudinal tensile force is applied to the softened portion 20b of the glass preform 20 by moving the second holding member 33 to elongate the glass preform 20. As can be recognized from FIG. 4, when the maximum temperature T of the softened portion 20b satisfies Eq. 1, no excess shrinkage occurs in the elongated portion 20c. Therefore, in the method of elongating the glass preform 20 of the above embodiment, the glass preform 20 is heated so that the maximum temperature T of the softened portion in elongation satisfies the relation represented by Eq. 1, and thus the glass preform 20 can be elongated while excess shrinkage of the through holes 23 is suppressed.

If the microstructured optical fiber 10 is produced from the glass preform elongated while excess shrinkage is suppressed as described above, excellent characteristics such as wavelength dispersion of a large absolute value and the like can be realized.

While this invention has been described in connection with what are presently considered to be the most practical and preferred embodiments, the invention is not limited to the disclosed embodiments, but on the contrary, is intended to cover various modifications and equivalent arrangements included within the sprit and scope of the appended claims.

For example, an electric heater may be used as a heating means. In this case, at least one of the electric heater and the glass preform 20 may be moved to successively heat-melt one of the ends of the glass preform 20 by the electric heater. In heat-melting the glass preform 20 by the electric heater, the space between the first holding member 32 and the second holding member 33 may be extended to elongate the glass preform 20.

The elongation apparatus may be a vertical type. Also, the pre-elongation portion 20a (i.e., pre-elongation glass preform 20) may be elongated to form the elongated portion 20c (i.e., post-elongation preform), and then the elongated portion 20c may be used as the pre-elongation portion 20a and further elongated.

Although, the second holding member 33 in the above-described embodiment, is moved away from the fixed first holding member 32, any moving method may be used provided that the space between the first holding member 32 and the second holding member 33 is extended. Therefore, for example, at least one of the first holding member 32 and the second holding member 33 may be moved to extend the space between the first holding member 32 and the second holding member 33. Both the first holding member and the second holding member may be moved, while the heating means is fixed. In this case, the moving speed of the heating means relative to the glass preform is preferably not less than 4 mm/min and not more than 20 mm/min.

An additive to be added to the core region 11 may be a material for increasing the refractive index other than $GeO_2$, or a material for decreasing the refractive index, or no material may be added to the core region 11. Furthermore, the core region may be hollow. Therefore, a glass preform corresponding to such a structure may be elongated.

Although, in the embodiment, the glass preform corresponding to the microstructured optical fiber having the air holes 13 arranged in a hexagonal lattice in a cross-section perpendicular to the fiber axis is elongated, the structure of the microstructured optical fiber is not limited to this. The above-described method of elongating the glass preform can be applied to elongation of any kind of glass preform for forming a microstructured optical fiber having air holes. Although the holes for forming the air holes of the microstructured optical fiber are through holes in the above-described embodiment, the holes are not limited to the through holes; any holes may be formed extending in the longitudinal direction of the glass preform.

The entire disclosure of Japanese Patent Application No. 2003-035233 filed on Feb. 13, 2003 including specification, claims, drawings and summary are incorporated herein by reference in its entirety.

What is claimed is:

1. A method of elongating a glass preform, comprising:
   holding both ends of a glass preform having holes extending in the longitudinal direction by a first holding member and a second holding member, respectively; and
   successively heat-melting the glass preform from an end thereof by a heating means while increasing the distance between the first holding member and the second holding member in the longitudinal direction of the glass preform so as to elongate the glass preform;
   wherein the glass preform is elongated by heat-melting with the heating means so that the temperature T satisfies a relation by Eq. 1

$$11[°\text{C./mm}] \cdot D[\text{mm}] + 860[°\text{C.}] < T[°\text{C.}] < 17[°\text{C./mm}] \cdot D[\text{mm}] + 880[°\text{C.}] \quad (1)$$

where D is the outer diameter of a post-elongation glass preform, and T is the maximum temperature of a softened portion of the glass preform (prre-elongation) heat-melted by the heating means.

2. A method of elongating a glass preform according to claim 1, wherein the glass preform is heat-melted by moving the heating means from an end of the glass preform to the other end at a velocity in the range of not less than 4 mm/min and not more than 20 mm/min relative to the glass preform.

3. A method of elongating a glass preform according to claim 1 or 2, wherein the glass preform is elongated in a manner such that the relationship Eq 2 is satisfied:

$$0.6 \cdot S[mm] < D[mm] < 0.98 \cdot S[mm] \qquad (2)$$

where S is the outer diameter of the glass preform (pre-elongation) and D is the outer diameter of the post-elongation glass preform.

4. A method of elongating a glass preform according to claim 1 or 2, wherein the glass preform is elongated while a gas is passed through the holes thereof.

5. A method of elongating a glass preform according to claim 3, wherein the glass preform is elongated while a gas is passed through the holes thereof.

* * * * *